United States Patent

[11] 3,620,988

[72] Inventor  Louis Cohen
             Avon Lake, Ohio
[21] Appl. No. 772,406
[22] Filed     Oct. 31, 1968
[45] Patented  Nov. 16, 1971
[73] Assignee  The B. F. Goodrich Company
             New York, N.Y.

[54] METHOD OF PREPARING BEAD-TYPE POLYMERS
     12 Claims, No Drawings
[52] U.S. Cl. .................................................. 260/17.4,
     260/29.6 XA, 260/29.6 WB, 260/29.6 H, 260/29.6
     SQ, 260/29.6 PM, 260/78.5 R, 260/78.5 N,
     260/78.5 BB, 260/80.3 E, 260/80.75, 60/80.76,
     260/80.8, 260/92.8 W, 260/93.5 W, 260/29.6 RB,
     260/29.6 Z, 260/29.6 MQ, 260/80.3 R, 260/875
[51] Int. Cl. ................................................. C09j 3/02,
                                             C09j 3/12, C08d 9/06
[50] Field of Search .......................................... 260/17.4
     ST, 93.5 W, 92.8 W, 29.6 Z, 29.6 EM, 29.6 OL,
     29.6 RU, 29.6 WU, 29.6 O, 29.6 H, 29.6 PM

[56]             References Cited
              UNITED STATES PATENTS
2,108,044  2/1938  Crawford et al. ............. 260/17.4 X
2,459,955  1/1949  Morrison et al. ............. 260/17.4 X
2,494,517  1/1950  Naps ........................... 260/17.4 X
2,701,245  2/1955  Lynn ............................ 250/89.5
2,923,692  2/1960  Ackerman et al. ........... 260/17.4
3,030,343  4/1962  Jones ........................... 260/78.5

Primary Examiner—William H. Short
Assistant Examiner—R. J. Koch
Attorneys—R. W. Wilson and Harold S. Meyer ABSTRACT: There is disclosed a method wherein discrete droplets of liquid monomer containing a monomer-soluble free radical-type catalyst are suspended in an aqueous mucilage having plastic flow properties and at least a minimum critical yield value induced by a water-insoluble polymeric thickening dispersing agent such as a carboxyl-form or dual-salt forms of a cross-linked polyacrylic acid. The polymerization is carried out at the usual temperatures under substantially quiescent conditions whereby the droplets are not subjected to sufficient shear to deform or subdivide them. Salts of nitrobenzene sulfonic acids added to the aqueous phase further suppress new particle initiation therein, narrows the particle sized distribution, and produces clearer product suspensions. The products are obtained as permanent suspension of discrete beads usually of spherical shape and having great clarity, low water sensitivity and good electrical properties. The method is ideally adapted to the continuous mode of operation. The suspensions are permanent yet the aqueous phase is easily removed by screening or centrifuging thereby permitting both easy isolation of dry beads and, if desired, easy concentration of the suspension to very high polymer solids levels.

METHOD OF PREPARING BEAD-TYPE POLYMERS

BACKGROUND OF THE INVENTION

Many of the commonest monomeric materials, and particularly vinyl chloride, the alkyl acrylates, the alkyl alkacrylates such as methyl methacrylate, and styrene are being polymerized on a very large scale either in aqueous suspension or in aqueous dispersion (i.e. latex form) employing colloidal suspension agents or soaps and/or synthetic detergent-type dispersing agents. In all of these methods, moderate to vigorous agitation is depended on to suspend and/or disperse, and to maintain such suspension or dispersion, during polymerization and to assist heat transfer to reactor cooling surfaces. Such methods, while universally employed on a commercial scale for many years are fraught with many difficulties and are not as economical as might be. For example, in even the best of these suspension-type polymerization systems employing a monomer having per se little ability to dissolve its polymer such as vinyl chloride, polymer deposition on the walls of the stirred polymerization vessel is relatively severe when rated against other commonly employed solution and emulsion type systems. In the suspension polymerization of vinyl chloride it may be necessary to clean the reactor every one or two runs whereas experience with continuous solution and emulsion polymerization systems of other monomers shows reactor cleaning intervals may stretch for weeks or a month or two or more. Continuously operating forms of these suspension systems have been little used.

Likewise, Trommsdorf and Schildnecht, in High Polymers, Vol. X, pp. 94 through 97, list many other difficulties of the known suspension (or bead or pearl type) polymerization systems. Frequently, and for unknown reasons, agglomeration of the charge can occur, sometimes so rapidly as to lead to destruction of the stirring device. With highly insoluble, tough and hard polymers such as polyvinyl chloride, the failure of agitation can be nearly catastrophic because of either runaway temperature and pressure which can be explosive and/or lead to the formation of a "solid charge" which can only be removed from the reactor with the very greatest difficulty and expenditure of large amounts of hand labor.

The formation of imperfectly formed, adhered, agglomerated, and hollow, cloudy or opaque beads, or even fibrous and colloidal polymer contaminating the beads and therefore necessarily removed by classification, is also a difficulty.

Such known suspension polymerization systems have employed either water-soluble "protective colloids" such as gelatin, cellulose derivatives, polyvinyl alcohol, salts of polyacrylic acids, etc., or finely divided solid mineral-type additives such as bentonite clay as suspension stabilizers. As shown in the above reference, agitation is essential at all times using such additives. Also, such literature reference shows, p. 74, that the "organic polymers serving as suspension stabilizers be soluble in water but incompletely soluble in the monomer phase."

U.S. Pat. No. 2,701,245 is the only known instance of a suspension polymerization system claiming to employ a quiescent period during polymerization. The latter method, however, employs water soluble wetting or surface-active agents as an aid in forming monomer droplets and, as a result, the quiescent reaction medium stratifies, first at the top and, after polymerization, at the bottom of the reaction vessel. Stratification would likely cause severe reactor fouling in a commercial size reactor. Even worse, the patent example shows a wastage of from about 3 to about 5 percent of the product as a colloidal polymeric material which must in some way be separated from the product.

SUMMARY OF THE INVENTION

In accordance with the present invention, I have discovered that the above and other difficulties are avoided by my new method wherein a liquid monomeric material of low solubility in water (i.e. a solubility in water below about 5 percent/wt.) containing a monomer-soluble free radical type catalyst is suspended as discrete droplets of a desired size in an aqueous medium thickened with a water-insoluble, highly gelled polymeric suspending/dispersing agent which imparts plastic flow properties to such medium and imparts at least a minimum critical yield value thereto and carrying out the polymerization under substantially quiescent conditions. The term "substantially quiescent conditions" as thus employed means an absence of turbulence or the absence of shearing forces sufficient to deform the suspended droplets of monomer and/or to damage the bead at any stage of conversion. The reaction medium remains quite mobile (at low shear rates) at all stages of the process and this is so even at solids levels of 25, 40 percent or more. As a result, such reaction media may be pumped, poured, and/or pressurized through pipe lines or over heat exchange surfaces during the reaction and/or during workup, under conditions wherein the character of flow is not more violent than plastic or laminar flow.

I have also found that, with monomers that naturally produce sticky polymers, the final reaction medium or polymer suspension will be useful as a novel pressure-sensitive adhesive. The ability of the process and of the product to reach high solids levels simplifies the preparation of such adhesives. For example, one can prepare directly a suspension at solids level of 40 to 70 percent/wt. reachable in other systems only by very careful control and/or by the agglomeration and/or concentration of more dilute aqueous latices, but an even simpler procedure is to prepare a product of this invention at more moderate solids levels of 25 to 40 percent/wt. and to separate therefrom an appropriate portion of the aqueous phase to yield the desired high solids level in the range of 50 to 70 percent/wt. or more solids content. The latter operation is, in most cases, a simple screening or centrifuging operation. The elaborate procedures of the art to prepare, agglomerate and/or otherwise concentrate aqueous latices or emulsions to yield such adhesives is not only difficult and expensive but of limited ability to remove electrolytic and hydrophilic residues present in the original latex.

I have found that plastic flow characteristics in the aqueous media is essential to suspension stability of the order here required and to successful practice of the method of the invention conducted in the absence of turbulence. Heretofore employed "soluable" suspension stabilizers or colloids such as polyvinyl alcohol, gelatin, cellulose derivatives, soluble polymers such as sodium polyacrylate, and the like are not capable of imparting plastic flow characteristics, at least at economical concentrations. Such known suspension stabilizers evidence newtonian or pseudoplastic flow behavior. Pseudoplastic flow behavior is characterized by an increase in viscosity with decrease in the rate of shear but at zero shear rates, essentially zero or very low yield value. Thus, known suspension stabilizers merely retard settling and are effective only in agitated systems. Pseudoplastic or newtoniañ behavior of most known thickeners or suspending agents is responsible for the "shake well before using" labels on many of our present-day drug, cosmetic and proprietary household formulations since under quiescent conditions the pseudoplastic suspending agent or thickener is of sharply reduced suspending efficiency.

The water-insoluble suspension stabilizers employed in the method of this invention are essentially completely gelled out, when added to an aqueous medium, swell very greatly until the aqueous phase becomes a continuous, nongrainy gel phase evidencing plastic flow behavior wherein the medium evidences a minimum critical yield value (or finite shear stress at zero shear rate) sufficient to maintain the monomer droplets "frozen" in permanent suspension (i.e. no sedimentation or stratification on standing for at least two months). Such media are not unduly viscous at low shear rates encountered in plastic or laminar flow. Many of the reaction mixtures of this invention are no more viscous at low or moderate shear rates (10 to 100 Sec-1 ) than, for example, pure glycerine.

Even though such media do not separate on standing they are easily separable into polymer solids and aqueous phase by simple screening, centrifuging or the like.

Reaction rates in this process are normal and subject to the usual control; the molecular weight of the polymer is normal and subject to the usual control methods; and very high monomer conversions may be achieved without difficulty. Temperature control is no problem, as might be expected under nonturbulent conditions, since the reacting mixture exhibits good plastic flow and may be pressured or otherwise forced to flow in proximity to heat exchange surfaces or through long tubelike or sheetlike (concentric) reactors immersed in or containing a cooling medium. THe very great suspension stability permits this type of operation and, as a result, makes the process an ideal one to carry out in a continuous manner. Also, the very great suspension stability reduces polymer buildup on reactor heat exchange surfaces to very low values making it possible to achieve very high on-steam efficiencies for each reactor.

The method also makes it possible to tailor-make the particle size of the product anywhere desired in the range of from about 1 micron or lower to about 1 centimeter or more in average diameter. The manner in which this is accomplished will appear more clearly below.

The product is of the valuable spherical bead or "pearl" form with most monomers and, with many of the monomers capable of producing optically clear polymers, the beads are entirely clear, perfectly spherical, unagglomerated and of a relatively uniform particle size. The water sensitivity and the electrical properties of the polymers are better than those achieved in known emulsion and suspension systems. The water absorption of a curable copolymer of ethyl acrylate and chloroethyl vinyl ether made by the method of this invention, for example, after 4½ hours in boiling water is only 12.7 percent/wt. increase as compared to 138 percent for a similar copolymer prepared in the conventional manner by coagulation from a latex.

DETAILED DESCRIPTION

The amount of the insoluble suspending agent or thickener required in any given circumstance for proper yield value is easily determined.

The minimum yield value required in the aqueous medium for suspension stability with any given monomeric material depends on the density difference between the monomeric and aqueous phases (labeled "$D-D_o$" and expressed as grams/cm.$^3$); on the desired or actual radius (R) of the suspended monomer droplet (expressed in cm.); and, of course, on the acceleration of gravity (g.) expressed in cm./sec.$^2$; usually 980 cm./sec.$^2$). The minimum Brookfield Yield Value ("BYV") for permanent suspension can be calculated by the formula:

(1) $BYV = [25.6R(D-D_o)g]^{2/3}$ wherein the terms are as identified above. This equation is valid only for the materials evidencing plastic flow properties as described in this invention.

In practice one would want to employ aqueous media having a BYV somewhat in excess of the calculated minimum in order to make absolutely certain that suspension stability is easily achieved and fully maintained throughout the reaction. It is preferred to employ aqueous mucilaginous media having a measured or actual BYV at least 25 percent and preferably from about 50 percent to 200 percent or more higher than the calculated minimum.

Actual BYV values conveniently are measured or calculated from rheological data obtained by the use of the Brookfield RVT Viscometer (operated at the temperature to be utilized in polymerization) whereby one measures the Brookfield apparent viscosity (in centipoise) at 0.5 r.p.m. and again at 1.0 r.p.m. If these data are plotted against shear rate and the curve extrapolated to zero shear rate one obtains BYV directly. However, the minimum BYV for permanent stability can be approximated from the expression:

(2)
Approx. BYV =
$$\frac{\text{Apparent Brookfield Visc. @ 0.5 r.p.m.} - \text{Apparent Brookfield Visc. @ 1.0 r.p.m.}}{100}$$

In many cases; a useful and easily measured and calculated viscometric parameter is the ratio (R') of the BYV divided by the apparent Brookfield viscosity measured at 20 r.p.m. This ratio will vary somewhat depending on the magnitude of BYV. The expression (1) given above incorporates an empirical correction factor which compensates for this error. The media exhibiting the larger R' value will permit the desired suspension stabilizers with the greatest fluidities.

In general, the BYV values with the preferred suspending agents of this invention will be, at a minimum, in the range of 50 to 75 for many common monomers and common particle sizes. Most often with many monomers the practical operating range will be from about 75 to about 250. The Brookfield apparent viscosity 20 r.p.m. of media of such BYV will be in the range of about 1,000 to about 2,000 cps.

WATER-INSOLUBLE SUSPENDING/DISPERSING AGENTS

The suspending agents found to impart the desired rheology to the aqueous medium in the method of this invention are the water, dioxane- and organic solvent-insoluble carboxylic and dual-salt forms or partial dual salts of insoluble carboxylic polymers prepared from a monomeric material selected from the class consisting of, as essential monomers (1) at least one alpha-beta unsaturated carboxylic acid or alpha-beta unsaturated carboxylic acid anhydride and (2) a polyfunctional (i.e. at least two nonconjugated

groups per molecule) cross-linking monomer which generates hydrolysis-resistant cross-links in the polymer and thereby produces a suspending agent of stable viscosity and flow behavior. Polymeric suspending agents of this definition, their conversion to aqueous mucilages and the properties of the latter are disclosed in much greater detail in U.S. Pat. Nos. 2,923,692 and 3,030,343.

As indicated above, the carboxylic monomers utilizable in preparing the polymeric suspending/dispersing agents useful in this invention contain at least one active carbon-to-carbon double bond in the alpha-beta position with respect to a carboxyl group thusly (3) 

wherein $R_1$ is hydrogen or a —COOH group, and each of $R_2$ and $R_3$ is a hydrogen or a monovalent substituent group which is linked to one of the doubly bonded carbon atoms. Carboxylic acids within this definition include acids such as acrylic acid wherein the double bond is terminal thusly (4) 

or the dicarboxylic acids such as maleic acid and other anhydrides of the general structure (5) 

wherein R and R' are monovalent substituent groups and especially those selected from the group consisting of hydrogen, halogen and cyanogen (—C≡N) groups and alkyl, aryl, alkaryl, aralkyl and cycloaliphatic radicals.

Included within the class of carboxylic acids shown in structure (3) above are widely divergent materials as the acrylic acids such as acrylic acid itself, methacrylic acid, ethacrylic acid, alpha- and beta-chloro, -bromo, and -cyano acrylic acids, crotonic acid, beta-acryloxy propionic acid, alpha-beta isopropylidene propionic acid, cinnamic acid, maleic acid, fumaric acid, itaconic acid, and many others.

Polymerizable carboxylic acid anhydrides include any of the anhydrides of the above acids (including mixed anhydrides) ad those of structure (5) including maleic anhydride and others. In many cases it is preferred to copolymerize an anhydride monomer with a comonomer such as methyl vinyl ether, styrene, and others.

It is much preferred to employ in the method of this invention the polymeric suspension/dispersing agents derived from polymers produced by the polymerization of the alpha-beta, monoolefinically unsaturated carboxylic acids. Even more preferred are those derived from the acrylic acids and alpha-substituted acrylic acids if the structure:

(6) 

wherein X is a monovalent substituent selected from the class consisting of hydrogen, halogen, hydroxyl, carboxyl, amide, ester, lactone, lactam, and cyanogen groups.

Most preferred as polymeric suspending/dispersing agents are those prepared from the cross-linked interpolymers of acrylic acid itself. These agents are by far the most efficient and have by far the most desirable viscosity characteristics, viscosity stability and tremendous suspending ability.

The cross-linking agents which may be employed with any monomeric mixture within the above classes may be any compound, not necessarily monomeric in nature, containing a plurality (i.e. 2 or more) of terminal polymerizable monovinylidene

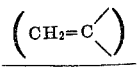

groups per molecule. Illustrative of this class of material include polyunsaturated-hydrocarbons, -polyethers, -polyesters, -nitriles, -acids, -acid anhydrides, -ketones, -alcohols and polyunsaturated compounds of this class incorporating one or more of these and other functional groups. Specifically, there may be utilized divinyl benzene, divinyl naphthalene, low molecular weight (soluble) polymerized dienes such as polybutadiene and other soluble homopolymers of open-chain, aliphatic, conjugated dienes (such soluble polymers not containing any appreciable number of conjugated double bonds) and other polyunsaturated hydrocarbons; polyunsaturated esters, ester-amides and other ester derivatives such as ethylene-glycol diacrylate, ethylene-glycol dimethacrylate, allyl acrylate, methylene-bisacrylamide, methylene-bis-methacrylamide, triacrylyl triazine, hexallyl trimethylene trisulfone and many others; polyunsaturated ethers such as divinyl ether, diallyl ether, dimethyallyl ether, diallyl ethylene glycol ether, diallyl, triallyl and other polyallyl ethers of gylcerol, butene-1,2 diol, 1-peneyl- 1,2,3,-propanetriol, the poly-allyl, -vinyl, and -crotyl polyethers containing from 2 or 7 or more of these or other alkenyl ether groupings per molecule and made from polyhydric alcohols such as the carbohydrate sugars, the so-called "sugar alcohols" including erythritol, pentaerythritol, arabitol, iditol, mannitol, sorbital, inositol, raffinose, glucose, sucrose, and many others, and other polyhydroxy carbohydrate derivatives, the corresponding polyalkenyl silanes such as the vinyl and allyl silanes; and others. Of this large class the polyalkenyl polyethers of the carbohydrate sugars, sugar alcohols and other (polyhydroxy) carbohydrate type derivatives containing from 2 to 7 alkenyl ether groupings per molecule are particularly preferred. Such materials are easily prepared by a Williamson-type synthesis involving the reaction of an alkenyl halide such as allyl chloride, allyl bromide, methallyl chloride, crotyl chloride and the like with a strongly alkaline solution of one or more of the polyhydroxy carbohydrate derivatives. Cross-linking agents of this class produce essentially completely gelled, cross-linked carboxylic polymers which (1) retain their rheological efficiency during neutralization and during service, (2) have the ability to swell most highly and (3) produce smooth, creamy and nongrainy mucilaginous compositions of the greatest suspending efficiency.

As indicated above, the insoluble polymeric suspending/dispersing agent is lightly cross-linked so as to remain highly swellable in water. As little as 0.05 to 0.1 percent/wt., more preferably 0.1 to 6 percent/wt. and most preferably 0.1 to 4 percent/wt. (all based on the total weight of monomers) of the cross-linking monomers produce such highly swellable polymers. With the preferred carbohydrate ether type cross-linking monomers of high functionality, smaller proportions from about 0.2 to about 2.5 percent/wt. of the latter are sufficient to obtain the desired polymer.

As little as 0.02 to 0.05 percent/wt. (based on the weight of mucilage) of the suspending/dispersing agents of this type are capable of imparting the desired yield values for permanent suspension. One may, if desired, employ from about 0.05 to 2 percent/wt. of such agents. More preferable is from about 0.05 to about 0.50 percent/wt. of the agent. Such small proportions indicate the very great suspending efficiency of these agents.

Products obtained by neutralizing or partially neutralizing the carboxyl content of the suspending agent with only ordinary monovalent alkalis such as sodium hydroxide, potassium hydroxide, ammonia and the like are seriously deficient in their ability to assist in breaking-up or dispersing the liquid monomer into droplet form. The acid-form of unneutralized polymer has this ability and so do the alkali/amine "dual-salts" of the same polymer. The acid-form polymer, however, is much less efficient than the dual-salts and must be employed in higher concentrations. Such dual-salts are prepared employing two or more neutralizing agents including at least one neutralizer from each of the following two classes:

A. Monovalent alkaline materials including ammonia and the alkali metal hydroxides, oxides, carbonates, and the like; and B. Basic organic long chain amines containing at least six carbon atoms, more preferably between about 10 and about 30 carbon atoms, per molecule.

In general, the polymeric suspending/dispersing agents swell most highly in water at a pH of from about 5 to about 8 and this range is a good one for good polymerization rates with many common monomers. This desired pH range is obtained by neutralizing from about 15 to about 85 mol percent, more preferably from about 20 to about 40 mol percent of the carboxyl content present in the acid-form agent. The amine-salt groupings on the polymeric agent are believed to improve its association with the monomer and thereby assist the breaking up or dispersion of the monomer in droplet form. In this sense, the acid-form and alkali/amine dual salt forms of the agents are both thickeners and polymeric suspending/dispersing agents whereas the single alkali salts are mere thickeners.

The class "A" neutralizing agents useful in this invention include ammonia, sodium hydroxide, sodium oxide, sodium carbonate, sodium bicarbonate, potassium hydroxide, potassium oxide, potassium carbonate, potassium bicarbonate, the hydroxides, oxides, carbonates, and bicarbonates of lithium, rubidium and cesium, and others.

The class "B" basic organic amines useful in this invention include the long chain aliphatic primary, secondary and tertiary amines and quaternary amines, and alkylene oxide treated amines of this type, containing from six to 30 carbon atoms or more. More preferred are the amines containing from 10 to 30 or more carbon atoms. Most preferred are the ethylene oxide condensates of the latter class of long chain amines. Specific examples of these long amines which may be utilized include n-hexyl amine, n-octyl amine, tri-n-octyl amine, n-decyl amine, di-n-decyl amine, n-dodecyl amine, di-n-dodecyl amine, stearyl amine, ethylene oxide/dodecylamine condensates, and tetraalkyl ammonium hydroxides such as tetraoctyl ammonium hydroxide and tetradodecyl ammonium hydroxides. The preferred amines are the dodecyl amines and the amine/ethylene oxide condensates of the formula;

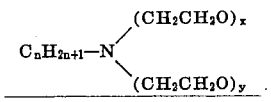

wherein $n$ is a number between about 10 and about 15 and $x + y$ equals about 15. Such compounds may have molecular weights in the range of between about 750 and about 1,500 and, for this reason, not a very high molar proportion need be utilized to effect a very noticeable increase in the organophilicity of the polymeric suspending/dispersion agent.

In fact, only about 0.2 to about 10 mol percent of the carboxyl content of the suspending/dispersing agent need be reacted with a long chain amine, more preferably from about 0.5 to about 2.5 mol percent will usually be sufficient. Expressed in terms of weight ratios such proportions with respect to the class "A" neutralizer will range from about 0.01 to 0.02:1 to about 0.2:1.

With many monomers it is necessary, usually, to include in the mucilage a suppressor or inhibitor of aqueous phase polymerization. In some cases it is the small but finite solubility of the monomer in water whereby monomer transfers to the aqueous phase as fast as it is polymerized therein. In the latter cases, a very substantial proportion of the total monomer may be consumed in this manner. In the usual case, polymer formed in the aqueous phase is of a very fine powdery nature most difficult to recover without loss and the presence of which unduly complicates bead recovery operations and leading to high polymer losses. In some cases, even monomers of low solubility in water produce such results without the aqueous phase inhibitor present. In the latter cases some obscure transfer reaction may be transferring monomer from the droplets to polymer nuclei in the aqueous phase at a rate above that indicated by the solubility of the monomer in water. Since chance impurities in water and the other ingredients may encourage or increase such reactions, the addition of a small amount of an inhibitor to the aqueous phase insures bead-only formation. Polymerization in the aqueous phase manifests itself by a milky appearance in the suspension and sometimes by a frosty or milky appearance of the beads. With the inhibitor, both the suspension and the beads remain clear throughout the reaction.

I have found that alkali and ammonium salts of nitrobenzene sulfonic acids are soluble in the mucilage and are remarkably efficient as this type of inhibitor. Other water-soluble inhibitors of free radical catalysts and chain-terminating type compounds may be utilized. The salts of 2,4-dinitrobenzene sulfonic acid are particularly effective. Only very small proportions of these inhibitors are required since excellent results are obtained at concentrations of from about 50 to about 250 p.p.m.

Such agents are strongly ionic and tend to reduce the mucilage viscosity. When used, a small increase in the concentration of the latter from about 5 percent to about 25 percent may be required to achieve the desired rheology. The mucilage is easily prepared by combining the dry polymeric agent, neutralizers and inhibitors, if any, and gently agitating until the mixture appears smooth and creamy. Alternatively, all ingredients of the polymerization reaction mixture including the long chain amine but not the alkali may be combined and gently agitated until the mucilage forms but without monomer dispersion. As a last step a dilute solution of alkali is added and agitation continued. Almost immediately the reaction mixture thickens and the separate liquid monomer phase disappears as the droplets appear.

The separately prepared aqueous mucilaginous composition and the liquid monomer containing catalyst may be combined and intermixed under the appropriate conditions of shear in order to cause the breaking up of the continuous monomer phase into droplets of the desired size. If the monomer is volatile, this operation is best carried out in a closed vessel, with or without an inert atmosphere or a vacuum over the mixing liquids. A completely filled vessel approach may be utilized. Once dispersed or suspended, however, the suspension shows unique and quite unexpected properties. For example, a reaction medium of this invention containing a suspension of 10 percent/wt. concentration of vinyl chloride containing isopropyl percarbonate catalyst can be placed in an open beaker and polymerization carried out under quiescent conditions at room temperature without boiling being observed. This unusual result is obtained at a temperature about 38° C. above the normal boiling point of vinyl chloride. Thus, the aqueous mucilaginous medium of this invention appears capable, in some cases at least, of completely suppressing nucleation of boiling of a volatile monomer. This could be one property of the medium which can aid in maintaining the beads free of voids and also can aid in suppressing polymer buildup on reactor surfaces.

The mixture of mucilage and monomer is agitated with the intensity of agitation selected or varied to yield the desired monomer droplet size. Droplet size is inversely related to shear rate during this operation. With any given combination of monomer and mucilage, the requisite degree of agitation for a given droplet size needs be determined experimentally by trial-and-error but this is not difficult due to the pronounced tendency of an organic liquid of ordinary viscosity to break up into droplets in such a medium. One can obtain a rough measure of the required intensity of agitation by placing the correct or desired proportions of mucilage and monomer in a stoppered test tube and count the number of inversions of the test tube required to suspend the monomer in the mucilage. With many of the common monomers and with mucilages having at least the minimum critical yield value required, a mere 30 or 40 inversions of the test tube at the rate of 30 inversions per minute will produce suspensions of relatively large droplets (1 to 3 mm. dia.). Finer droplet sizes can be achieved with many common mixing devices and/or homogenizer-type equipment. In large scale, repetitive commercial operations procedures for obtaining the desired droplet size can be prepared in terms of the mixer or agitator type, agitation rate, agitation time and temperature.

The monomer so suspended must contain a small amount of a monomer- or oil-soluble catalyst such as is described below. Such monomer may also contain, if desired, certain other additives such as molecular weight controllers including the long chain aliphatic mercaptans employed in the polymerization of acrylic rubbers. Catalysts such as the alkanoyl, aroyl, alkaroyl and aralkanoyl diperoxides and monohydroperoxides, azo compounds, peroxy-esters, percarbonates, and many other free radical type catalysts may be employed with the monounsaturated monomers. Illustrative peroxides which may be employed include benzoyl diperoxide, lauryl diperoxide, diacetyl peroxide, cumene hydroperoxides, methyl ethyl ketone peroxide, diisopropylbenzene hydroperoxide, 2,4-dichlorobenzoyl peroxide, napthoyl peroxide, t-butyl perbenzoate, di-t-butyl perphthalate, isopropyl percarbonate and many others. Illustrative azo-type catalysts include azo-bis-isobutyronitrile alpha, alpha'-azodiisobutyrate, and many others. The choice of any particular free radical catalyst is dictated partially by the choice of monomeric material, by color requirements of the polymer, and to some extent by the temperature of polymerization to be employed.

POLYMERIZATION

The polymerization step may be carried out at any temperature normal for the monomeric material to be polymerized. In general, the range between about 0° C. and about 150° C. will polymerize most known monounsaturated monomeric materials, A more preferred range is between about 25° C. and about 100° C.

In order to facilitate temperature control under the relatively quiescent conditions of the method of this invention, the reaction medium is brought into contact with cooling surfaces cooled by water, brine, evaporation, etc. In general, the polymerization reactor for the method of this invention should have a considerably higher ratio of surface to volume than is employed in agitated systems. A preferred type of reactor is one or more long, narrow tubes immersed in a cooling bath through which the reaction medium is forced to flow at moderate speeds. Such tubes can be arranged in coils, banks (as in steam boilers) or layers to secure the required reaction volume. Such tubes can vary from about 0.5 inch to 1 or 2 inches or more in diameter depending on the scale of operations. Another type of reactor is a reaction chamber much longer than its width in which are placed cooled plates or fins.

MONOMERIC MATERIALS POLYMERIZED

It is a unique feature of the process of this invention that the monomeric material to be polymerized is limited only by the requirement for solubility of less than about 5 percent/wt. in water and by the availability of an operable monomer-soluble free radical catalyst capable of mass-polymerizing the monomer in question. Monomers which polymerize normally to form sticky polymers are easily employed in the process with no difficulty due to the very great suspending efficiency of the aqueous medium. The so-called "critical period" in many older suspension polymerization systems, wherein the partially polymerized monomer droplets pass through a sticky condition at an intermediate conversion, is not observed. In fact, sticky, viscous monomer/polymer syrups sometimes referred to as "prepolymers" may be dispersed and suspended in the thickened aqueous medium and the polymerization of the monomer content of the droplets completed. The latter facility can be made use of in the preparation of high-impact resins wherein a rubbery impact improver or plasticizer may be dissolved in the monounsaturated monomer prior to suspension in the aqueous medium.

Illustrative monounsaturated monomers which may be employed in the method and products of this invention include vinyl chloride, vinyl bromide, vinyl fluoride, fluoride, vinylidene chloride, tetrafluoroethylene, styrene and nuclear-substituted styrenes, the alkyl acrylates, the alkyl alkacrylates such as methyl methacrylate, acrylonitrile, ethyl vinyl benzene, vinyl naphthalene, and many others as well as mixtures of any two or more of these and/or with still other similar monomers. In some cases, very minor proportions (i.e. up to 1 or 2 percent/wt.) of the more water-soluble monomers such as vinyl acetate, acrylic amides, acrylic acids, and others may be added to the more insoluble monomers and the polymerization conducted in a thickened aqueous medium containing an aqueous phase polymerization suppressant such as the salts of nitrobenzene sulfonic acids. Likewise, small proportions (i.e. up to about 5 percent/wt.) of polyunsaturated monomers such as divinyl benzene, glycol diacrylates, etc., may etc., employed provided the catalyst employed is capable of effecting the mass polymerization of the monomer mixture.

The preferred monomeric materials are vinyl chloride; the alkyl acrylates such as ethyl acrylate, butyl acrylate 2-ethylhexyl acrylate and others, and mixtures of these or with still other monomers such as 2-chlorethyl vinyl ether; the alkyl alkacrylates such as methyl methacrylate; styrene and nuclearly substituted halostyrenes; and acrylonitrile.

PRESSURE-SENSITIVE ADHESIVES

As indicated above, the method of this invention is easily applied to produce superior/pressure-sensitive adhesives in the novel form of bead suspensions. Such adhesives comprise (1) a high solids (50 percent –70 percent or more by weight) suspension/dispersion of a lightly cross-linked polymer of a higher alkyl acrylate and (2) a tackifier. Such a product contains beads of a sticky polyacrylate and such bead-form is retained, due to the light cross-linking, even after the suspension is coated on a substrate and heated to effect drying and formation of an adhesive deposit. Such bead-form adhesive deposit, when properly compounded with tackifiers, stabilizers, etc., evidences very high and tenaciously retained peel strength. Such an adhesive is admirably suited to application to paper and plastic substrates in the preparation of pressure-sensitive tapes.

As indicated such adhesive products are produced from monomeric mixtures predominating (i.e. more than 50 percent/wt.) in the higher alkyl acrylates, that is, alkyl acrylates in which the alkyl group contains from four to eight carbon atoms both with and without other comonomers such as acrylonitrile, methyl methacrylate, styrene and others together with a very small amount of a cross-linking monomer such as any hereinabove described employed in producing the suspending/dispersing agent but preferably a glycol diacrylate or other polyacrylate polyester of a polyhydroxy compound containing from three to five or six acrylate groups per molecule. The presence of a third comonomer often produces an adhesive of greater strength. Only from about 0.005 to about 0.20 percent/wt. of the cross-linking monomer based on the total weight of monomers, more preferably about 0.005 to about 0.05 percent/wt., need be utilized. The object here is to impart integrity to the beads but not to impair their ability to cohere one to another and to adhere to the substrate when applied as an adhesive layer.

As indicated, the bead-type pressure sensitive adhesive formulation is preferably compounded with a tackifier such as rosin, low molecular weight polystyrene (molecular weight below about 3,500), low molecular weight polyvinyl acetate, and the like. Rosin is the best and least expensive tackifier but imparts an undesirable yellowish cast to the adhesive layer. Polystyrene and polyvinyl acetate in the adhesive formulation produce clear, colorless adhesive deposits. From about 10 percent to about 40 percent/wt. of a tackifier or tackifiers will usually be sufficient in most pressure-sensitive adhesive formulations.

The invention will now be described in still greater detail with reference to several specific examples which are intended as illustrative only and not as limiting the scope of the invention.

EXAMPLE I

CONTINUOUS POLYMERIZATION

In this example, a mixture of 95 parts/wt. of ethyl acrylate and 5 parts/wt. of 2-chlorethyl vinyl ether is prepared and stored in a closed water-cooled container under an inert atmosphere of nitrogen. To this mixture there is added 0.2 percent/wt. of benzoyl peroxide and 0.02 percent/wt. of dodecyl mercaptan. The mixture is agitated briefly and the temperature maintained at or near room temperature to insure against premature mass polymerization.

In another vessel there are admixed demineralized water and 0.07 percent/wt. based on the water of "Carbopol 941" (registered trademark of The B. F. Goodrich Company; product is the carboxylic form of a copolymer of the monomeric mixtures described containing anhydrous acrylic acid and a mixture of polyallyl ethers of sucrose containing an average of from about three to about six allyl ether groups per molecule). The mixture is stirred gently for about 1 hour after which aqueous sodium hydroxide and a long-chain amine ('-'Ethomeen C-25" made by Armour and believed to be a reaction product of ethylene oxide and a long-chain aliphatic amine containing about 25 carbon atoms) are added to form a partial dual-salt form of the copolymer in which about 25 mol percent of its total carboxyl content is neutralized by the caustic and about 0.5 mol percent by the amine. Also added to this mucilage are —145 p.p.m. of the sodium salt of 2,4-dinitro-benzene sulfonic acid. The mixture is agitated gently until smooth. The BYV value of the resulting smooth, nongrainy mucilage is 154 and its apparent Brookfield viscosity at 20 r.p.m. is 2,010 cps.

The contents of the two vessels are combined in a weight ratio of 25 percent/wt. of the monomer and 75 percent/wt. of the mucilage. The monomer phase is slowly added to the water phase while rapidly agitating the latter with a "Lightnin" mixer forming a uniform suspension of droplets 0.36 mm. in average diameter. The resulting suspension is transferred to a pressure vessel under an atmosphere of nitrogen. The suspension is then pressured with nitrogen and caused to flow through a tubelike reactor immersed in a water bath maintained at the indicated temperatures. Such reactor consists of 88 ft. of ½-inch (I.D.) stainless steel tubing fabricated into a double coil 15-inches high and 15-inches in diameter. The total internal volume of such tubelike reactor is about 1 gallon, a convenient size which facilitates acquisition of flow rate data. Various experiments are conducted, see table I below, wherein the flow rates and residence times in the reactor are varied. The product is every case are small pearllike or beadlike particles of a rubbery terpolymer in which the chlorethyl vinyl ether groups function as reactive groups in vulcanization. Such polymer is similar to that of U.S. Pat. No. 2,568,659. The data below show a range of equivalent conditions which can pertain to reactions as just described.

employed contains 0.20 percent/wt. of the carboxylic form Carbopol 941 in demineralized water. The BYV of the latter is 84: its Brookfield apparent viscosity 20 r.p.m. is 1,060 cps; and its pH is 3.3. The monomer concentration is either 25 percent/wt. or 40 percent/wt.

The mucilage is prepared by adding the suspending/dispersing agent to water and very gently agitating for a few minutes until a stable viscosity and smooth nongrainy appearance is reached. The mucilage and the monomeric material are combined in a small sealed reaction vessel which is placed in a rack which rotates at about 30 r.p.m. such that the vessel is tumbled end-over-end. Only about 1 minute is required to form a stable suspension of large (1 to 3 mm. dia.) monomer droplets in the aqueous phase. The sealed reaction vessels are then purged with nitrogen, sealed again and mounted immovably in a constant temperature water bath maintained at 60° C. Following polymerization the vessels are opened and the product worked up either by pouring the mixture onto a 70 mesh Tyler scale) screen and then washed with water on the screen or the beads suspended in water and subjected to several slurry type wash operations carried out under agitation and decanting off the wash water after each cycle. The products are dried in a vacuum oven at 60° C. or 100° C.

| Residence time in coil-min. | Output rate. gal./hr. | Bath temperature, −° C. required* | Mean velocity, ft./sec. | Approximate shear rate (sec. −¹) | NRe** | Pressure drop, lbs./ft.²*** |
|---|---|---|---|---|---|---|
| 60 | 1 | 80 | .0244 | 4.5 | 2.9 | 24.0 |
| 30 | 2 | 90 | .0488 | 8.9 | 7.2 | 39.3 |
| 14 | 4 | 95 | .0976 | 17.8 | 17.8 | 61.8 |

*Bath temperature required to reach 95% conversion in residence time indicated.

$$**NRe = \frac{D^n V^{2n-1} P}{geK\left(\frac{3n+1}{4n}\right)} (8)^{n-1}$$

where NRe is the Reynolds number, where D is the tubing diameter, velocity (V), dispersion density (P), and the terms n and K are constants obtained from the rheological flow curve of the mucilage.
***Calculated.

The very low shear rates and Reynolds numbers clearly indicate laminar flow over the entire range of flow rates. The product in every experiment is found to possess the expected rubbery properties indicating that even with the extremely fast reaction rates here shown, temperature control and polymer molecular weight control are excellent. A rubbery polymer made in this way has much lower water pickup of only 12.7 percent/wt. after 4½ hours in boiling water as compared to a value of 138 percent for a similar polymer prepared in the conventional manner by coagulation of a latex.

In the above experiments the suspension of polymer leaving the tubelike reactor is run directly onto a screen. The collected polymer spheres are washed several times with clear water and dried at 50° C. in a vacuum oven where the particles coalesce forming directly sheets of rubbery product. The aqueous mucilaginous medium is reusable and can be recycled to the process in whole or in part after any necessary readjustment of its viscosity characteristics.

EXAMPLE II

In this example, an unneutralized mucilage of "Carbopol 941" is employed in the batchwise copolymerization of several different combinations of methyl acrylate, ethyl acrylate and n-butyl acrylate both with and without acrylonitrile and in one case with chloroethyl vinyl ether. The mucilage The data are as follows, in which proportions are parts/wt.

| Sample Number | 11 | 15 | 16 | 34 | 33 |
|---|---|---|---|---|---|
| Monomer phase: | | | | | |
| Butyl acrylate | 88 | 88 | 95 | 20 | 95 |
| Ethyl acrylate | | | | 80 | |
| Methyl acrylate | | | | | |
| Acrylonitrile | 12 | 12 | | | |
| 2-chloroethyl vinyl ether | | | 5 | | 5 |
| Benzoyl peroxide* | 0.02 | 0.032 | 0.019 | 0.02 | |
| Porophor-N** | | | | | * 0.01 |

*Expressed as parts/wt. per 100 parts/wt. of total monomer.
**"Porophor-N", made by Du Pont said to be azo-bis-butyronitrile.

| Sample Number | 11 | 15 | 16 | 34 | 33 |
|---|---|---|---|---|---|
| Percent monomers | 25 | 40 | 25 | 25 | 25 |
| Reaction time hours | 16 | 16 | 16 | 16 | 2 |
| Percent yield | 95 | 93 | 93 | 97 | 84 |
| Polymer description | (¹) | (¹) | (¹) | (¹) | (²) |
| Bead average diameter, mm | 2 | 2 | 1.5 | 2 | 2 |
| Inherent viscosity (0.4% in DMF at 2.5° C) | 2.52 | 1.88 | 1.35 | 3.05 | 4.48 |

¹ Very soft clear beads.
² Soft white beads.

The dried polymeric products have the properties expected and, in addition, have very low sensitivity to water and very good color.

EXAMPLE III

To compare the use of an unneutralized against a neutralized mucilage, mixtures of 95 parts/wt. of ethyl acrylate and 5 parts/wt. of 2-chloroethyl vinyl ether are polymerized in a Carbopol 941 mucilage neutralized as in example I. It is found that the concentration of the suspending agent in the neutralized mucilage must be reduced to 0.05 to 0.07 percent/wt. to obtain similar rheological properties. Several other variations are employed including the use of a mercaptan molecular weight controller, several catalysts, and a nitrobenzene sulfonic acid salt. The data are as follows:

because of losses and it is expected that the actual conversions are somewhat higher than indicated above.

EXAMPLE IV

The procedure of example III is twice duplicated with a small-scale batch and a large scale batch, but both employing a monomeric mixture and temperature similar to that of experiment 129. The size of the monomeric droplets are measured as are those of the beads of polymer obtained. The data

| Sample No | 26 | 41 | 118 | 124 | 129 |
|---|---|---|---|---|---|
| Monomer phase: | | | | | |
| Ethyl acrylate, part/wt | 95 | 95 | 95 | 95 | 95 |
| 2, CLEVE, parts/wt | 5 | 5 | 5 | 5 | 5 |
| Benzoyl peroxide, PHR | 0.4 | | 0.4 | 0.2 | 0.2 |
| Thiophenol | | 0.5 | | | |
| Dodecyl mercaptan | | | | | 0.02 |
| Aqueous phase: | | | | | |
| 0.05% suspending agent | X | X | | | |
| 0.07% suspending agent | | | X | X | X |
| Percent/wt. monomer | 24 | 25 | 25 | 25 | 25 |
| BYV (aqueous phase) | 150 | 150 | 102 | 102 | 102 |
| Brookfield app. viscosity at 20 r.p.m | 1,950 | 1,950 | 1,375 | 1,375 | 1,375 |
| pH (aq. phase) | 5.2 | 5.2 | 5.4 | 5.4 | 5.4 |
| Percent total neutralization | 20% | | All | | |
| Percent chtomeen neutralized | 1.2 | 0.15 | 0.15 | 0.15 | 0.15 |
| Polymerization: | | | | | |
| (a) Temp., °C | 60 | 28 | 60 | 80 | 80 |
| (b) Time, hrs | 17 | 64 | 16 | 1.5 | 1.5 |
| (c) Conversion, percent/wt | >86 | >85 | >93 | >92 | >94 |
| Polymer suspension: | | | | | |
| Appearance | Cloudy | Cloudy | [2] Clear | [2] Clear | [2] Clear |
| Average bead diameter, mm | 0.5 | [3] | 1.5 | 2.0 | 2.0 |
| Bead appearance | [4] | [5] | [6] | [6] | [6] |
| Inherent viscosity [7] | 4.64 | 2.28 | 2.76 | 2.47 | 1.47 |
| Percent gel | 4.6 | 0.5 | 5.8 | 0 | 0 |

[1] 2-chloroethyl vinyl ether.
[2] Experiments 118, 124 and 129 employed 145 p.p.m. of the sodium salt of 2,4-dinitrobenzene sulfonic acid in aqueous phase.
[3] Fused.
[4] Frosty white.
[5] Frosty clear.
[6] Crystal clear.
[7] As in Example II.

Several observations on the above data are worthwhile. First, note the lowered concentration of suspending agent and reduced Brookfield Viscosity with the neutralized suspensions as against the unneutralized suspension of example II (0.05 percent or 0.07 percent/wt. vs. 0.20 percent in example II). Second note that the final suspension of polymer from examples 26 and 41 is cloudy whereas those of the remaining experiments which employed an inhibitor of aqueous phase polymerization are clear. At the same time note that the beads from a cloudy suspension are frosty and/or opaque whereas both the suspension and the beads in the experiments employing an inhibitor of aqueous phase polymerization are clear. Lastly, note the wide range of polymerization times and temperatures and also in the molecular weight of the polymer obtained. These variables produced their usual and expected effect. Note the significant molecular weight reduction (lowered I.V. values) in experiment 129 where a small amount of mercaptan is dissolved in the monomer. Data such as these are the source of the earlier statement herein that the polymerization in this method is subject to normal control. It is clear that with a monomer such as ethyl acrylate and CLEVE, soluble in water to the extent of about 5 percent/wt., it is ordinarily preferred to employ an agent for suppression of aqueous phase polymerization.

In the experiments, work up of the polymer in experiments 26 and 41 is difficult by simple screening so the suspension is diluted 4 or 5 times its original volume with water to cause the polymer beads to settle out after which the cloudy liquid content is decanted off. Polymer fines are lost by this operation. Several water washes are applied in the same manner after which the rubbery polymer is dried in an oven for 2 hours 60° C. In the remaining experiments the clear suspension of beads is merely poured into a 60-mesh screen (Tyler Scale), washed several times with fresh water on the screen, and finally dried in a vacuum oven for 16 hours at room temperature. The yields are somewhat low, especially in experiments 26 and 41, are as follows:

| Size batch | Percent yield based on monomer | Droplet wt. average particle size | Bead wt. average particle size | I.V. [2] | Percent gel |
|---|---|---|---|---|---|
| 20 grams | >99 | 350 | 330 | 2.08 | >1 |
| 1 gallon | 97.2 | 355 | 330 | 2.23 | >1 |

[1] Microns.
[2] As in previous examples.

Viscosity of mucilage
Before Polymerization (Both Samples) 2,000 cps.
After Polymerization (Both Samples) 1,600 cps.

Note that the droplets of this monomer mixture shrink only slightly in conversion to polymer. The viscosity of the suspension is still high after completion of the reaction.

A portion of the unpolymerized monomer-in-mucilage suspension prepared in example IV is mixed for 2 minutes in a small laboratory bench size Waring blender with 100 volts applied to its motor. This high shear mixing resulted in a stable, white (opaque), small particle size dispersion. The suspension is polymerized as in example III and IV and worked up by the decantation technique described above. The comparative results are as follows:

| | Example IV (large) | Example IV (fine) |
|---|---|---|
| Wt.Ave. Particle Size-Microns | 330 | 8.4 |
| Dried Polymer | Crystal Clear | Particles fused together into continuous mass due to work-up procedure. Slightly cloudy. |

This simple experiment indicates the very wide range in particle size obtainable simply by varying the amount of shear employed in making the suspension. This experiment shows that high shear mixing sharply reduced the particle size of already suspended large droplets.

EXAMPLE V

In this example, styrene is converted to clear spherical beads of a moderately large size easily visible to the naked eye. Mucilage "A" and a monomer/catalyst/modifier solution "B" are combined, the vessel purged with nitrogen and then 2.55 ml. of 0.1 N NaOH are added and the small reaction vessel hand shaken to effect dispersion of the monomer. The styrene droplets are plainly visible to the naked eye and the dispersion is clear. The materials employed are:

A

| | |
|---|---|
| 0.2%/wt. "Carbopol 941" mucilage | 49 ml. |
| "Ethomeen C-25" | 1.1 ml. |
| Water | 100 grams |

B

| | |
|---|---|
| Distilled Styrene | 70 ml. |
| Benzoyl Peroxide | 0.268 gram |
| Dimethyl aniline solution (1) | 0.100 gram |

(1) 10% in Heptane

The vessel and the suspension are allowed to stand in an air oven maintained at 60° C. over a weekend. When examined the suspension is still clear indicating very little, if any, polymerization had occurred in the aqueous phase. This would be as expected due to the very low solubility of styrene in water. The beads of polymer are isolated by screening and are washed on the screen with fresh water and dried in a vacuum oven for 2 hours at 80° C. There is thus recovered a total of 53 grams of polystyrene beads which are perfectly clear and of expected properties.

EXAMPLE VI

The method of this invention is found to be very useful in preparing polyvinyl chloride beads in the range of from about 1 to about 25 microns which are very useful as a "diulent" resin in plastisol formulations either to increase plastisol solids levels without inordinate viscosity increase or to produce plastisols of more moderate solids concentration having materially lowered viscosities. Up to the present time, there has existed no reliable method of producing polyvinyl chloride of this particle size range. In this example, 11.25 grams of acid-form "Carbopol 941" mucilage (0.08 percent/wt. active agent containing 200 p.p.m. of 2,4-dinitrobenzene sulfonic acid) is placed in a tubelike reactor and 0.150 ml. of a 0.1 percent/wt. solution of "Ethomeen C-25" added and 3.75 grams of liquid (polymerization grade) vinyl chloride monomer added. There are then added in rapid order 1.31 grams of a solution in vinyl chloride (35 parts by wt. per 100 part/wt. of vinyl chloride) of "Santicizer 160" (Monsanto, a polyvinyl chloride plasticizer; sp. Gr. 1.118, refractive index at 25° 1.53–1.54), 0.075 gram (2 parts/wt. per 100 parts/wt. of monomer) of "Epoxol 9-5" stabilizer (Swift; an epoxidized fatty acid ester) and 0.015 grams of benzoyl peroxide (0.4 part/wt. per 100 parts/wt. of monomer). A small portion of the vinyl chloride is allowed to boil off and purge the oxygen over the mixture before the tube is sealed. At this point there appeared to be little tendency for the monomer to disperse when the tube is inverted a number of times. At this time 0.238 ml. of 0.1N NaOH solution is injected by a hypodermic syringe and the tube again invented a number of times. A very good, clear and stable suspension is formed with only a limited number of inversions of the tube. The tube is suspended quietly in a 60° C. oil bath and observed. In about one hour the suspended droplets begin to whiten indicating polymerization is occurring. In about 15 hours, the reactor is opened and only a small amount of unreacted vinyl chloride escapes. When the mixture is stirred with a spatula, however, the remainder of the unreacted vinyl chloride boils off. The reaction mixture is very clear at this point indicating little or no polymerization in the aqueous phase. The contents of the reactor are poured through a 50-mesh (Tyler scale) screen, washed and dried for one-half hour at 45° C. in a vacuum oven. Approximately 3.1 grams of plasticized polyvinyl chloride beads are recovered which consist of about 1.72 grams of polymer and about 1.38 grams of plasticizer and Epoxol stabilizer (a total of 80 parts/wt. per 100 parts/wt. of resin). In spite of this very high plasticizer level there is no agglomeration of the beads or sticking thereof to the reaction vessel during polymerization.

Polyvinyl chloride beads made in a manner similar to this and having an average bead size of about 5 microns when added as a diluent resin to a plastisol formulation substantially reduce the viscosity of the plastisol. The beads of polyvinyl chloride are translucent rather than clear, and are perfect spheres due, apparently, to shrinkage and insolubility of the polymeric phase in the monomeric phase. In spite of this, the method produces directly a product of very considerable commercial utility and obtainable, at this time, in no other way.

EXAMPLE VII

In this example, a slightly cross-linked polymer of 2-ethylhexyl acrylate is prepared by the method of this invention for use as a pressure-sensitive adhesive. The materials utilized are:

| Mucilage A | Monomer Sol. B |
|---|---|
| 0.2%/wt. "Carbopol 941" mucilage—120 grams | 2-ethylhexyl acrylate[2]—240 grams |
| Water[1]—240 grams | Benzoyl peroxide—0.24 gram |
| 0.1% Aq. "Ethomeen C-25"—18 grams | "Sulfole B-8"[3]—0.048 gram |
| 0.1N NaOH 6 ml. | |

[1] Demineralized

[2] Contains 0.01%/wt. of an unknown cross-linking monomer but which could be a glycol diacrylate

[3] T. M. Phillips-t-dodecyl mercaptan

The mucilage is made up by charging the water to a conventional polymerization reactor having a variable-speed stirrer capable of speed up to 350 r.p.m.; next the dry "Carbopol" is added and the mixture allowed to agitate (160 r.p.m.) until the "Carbopol" is thoroughly swollen; next the long chain amine "Ethomeen C-25" is added and the stirring continued for about 5 minutes; and lastly the NaOH is added and the stirrer speed increased to 200 r.p.m. At this point, the Monomer Solution "B" is added by pouring it into the liquid vortex in the reactor while agitating at 160 to 300 r.p.m. The resulting mixture is then passed once through a motor-driven homogenizer and then back into the reactor to reduce the monomer droplet size. The stirrer is then shut off and hot water (80° C.) admitted to the reactor water jacket. A sample taken after 45 minutes of reaction showed a conversion of 98.5 percent. The reaction is allowed to stand for a total of 1 hour and 45 minutes to ensure completion of reaction and low odor. The product at this point is a smooth suspension of 37.7 percent/wt. of very small beads difficult to see without magnification.

The latter product is concentrated by passing once through a centrifuge to produce a final product containing 69 percent/wt. of polymer beads. The clear liquid obtained from the centrifuge has a viscosity similar but slightly lower than that of the original mucilage. To the concentrated suspension of beads there is added 20 percent/wt. based on the bead weight of a rosin tackifier emulsion. A thin layer of the resulting composition is spread on a substrate and heated in a vacuum oven to dry. A similar coating is prepared from a similar formulation prepared in a similar manner but without cross-linking. When the two adhesives are photographed through a microscope the deposit of cross-linked beads shows a surface in which numerous spheres of polymer are present whereas the deposit prepared from the polymer having no cross-linking has flowed during drying to a smooth surfaced deposit. The bead-type deposit of cross-linked polymer shows several times higher peel strength than the smooth-surfaced control deposit. The photograph of the bead-type deposit is remarkably similar in appearance to a similar photograph of the freshly prepared suspension of liquid monomer. In a series of experiments in which the degree of cross-linking is varied a definite maxima in peel strength at very low cross-linking levels equivalent to about 0.01 percent/wt. of cross-linking monomer is observed.

I claim:

1. In a method of polymerizing a monounsaturated monomer containing a dissolved monomer-soluble free radical catalyst in aqueous suspension to form bead-type polymer, the improvement which comprises utilizing as said monomer a monomeric material soluble in water not to exceed about 5 percent/wt. and containing not more than about 5 percent/wt. of polyunsaturated monomer, mixing from about 10 percent to about 40 percent of said monomeric material with from about 90 percent to about 60 percent of an aqueous mucilaginous composition having plastic flow properties whereby said composition evidences a minimum yield value sufficient to permanently suspend said monomer as droplets between about 1 micron and about 1 centimeter in average diameter, and carrying out polymerization of said droplets suspended in said mucilaginous composition at a temperature of about 0° C. to about 150° C. and in the absence of shearing forces exerted thereon thereby to produce beads of a resinous polymer substantially spherical in shape, said mucilaginous composition containing from about 0.05 to about 0.5 percent/wt. based on the weight of said mucilaginous composition of a water-insoluble, highly swellable polymeric suspending/dispersing agent in the acid form or the dual-salt form of an essentially completely gelled, lightly cross-linked carboxylic polymer prepared from (1) at least one alpha-beta unsaturated carboxylic acid or alpha-beta unsaturated carboxylic acid anhydride and from 0.05 to 6 percent/wt. based on the total weight of said carboxylic polymer of (2) a cross-linking monomer containing at least two nonconjugated

groups per molecule, provided that when said agent is of said acid form sufficient of its carboxyl groups are neutralized to induce in said composition a pH between about 5 to about 8, said neutralization being effected mainly by a monovalent alkaline material and from about 0.5 to about 2.5 mol percent of said carboxyl groups by a basic organic amine containing at least six carbon atoms per molecule, and said minimum yield value is given by the expression $[25.6R(D-D_o) g.]^{2/3}$ wherein R is the radius of said suspended droplets, D-Do is the difference in density between the aqueous and monomeric phases, and g. is the acceleration of gravity.

2. The method as defined in claim 1 and further characterized in that said aqueous mucilaginous composition contains, as an additional ingredient, from about 50 to about 250 p.p.m. based on the weight of mucilaginous composition of an alkali or ammonium salt of a nitrobenzene sulfonic acid as an inhibitor of aqueous phase polymerization and the proportion of said polymeric suspending/dispersing agent is increased from about 5 to 25 percent to compensate for any ionic effect of said additional ingredient.

3. The method as defined in claim 1 and further characterized by said polymeric suspending/dispersing agent being a cross-linked interpolymer of (i) a carboxylic monomer selected from the class consisting of the alpha-beta unsaturated carboxylic acids and anhydrides and (ii) from about 0.1 to 6 percent/wt. based on the total weight of monomers of a cross-linking monomer containing at least two nonconjugated $CH_2$

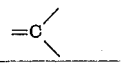

groups per molecule.

4. A method as defined in claim 3 and further characterized by said aqueous mucilaginous composition having a yield value from about 25 percent to about 200 percent higher than said calculated minimum value.

5. The method as defined in claim 1 and further characterized by said monounsaturated monomer being selected from the class consisting of the vinyl halides, styrene and nuclearly-substituted helostyrenes, alkyl acrylates, alkyl alkacrylates, acrylic nitriles, and mixtures thereof and said polymeric suspension/dispersion agent is derived from a water-, dioxane-, and organic solvent-insoluble copolymer of an acrylic acid and an alkenyl polyether of a polyhydroxy carbohydrate derivative containing from two to about six alkenyl ether groupings per molecule.

6. The method as defined in claim 5, and further characterized by said polymerization being conducted at a temperature regulated in the range of from about 0° to about 150° C. while said suspension is being moved under plastic flow in contact with heat exchange surfaces.

7. The method as defined in claim 5 and further characterized in that said aqueous mucilaginous composition contains from about 50 to about 250 p.p.m. based on the weight of mucilaginous composition of a water-soluble alkali or ammonium salt of a nitrobenzene sulfonic acid as an inhibitor of aqueous phase polymerization, said polymerization being conducted at a temperature regulated in the range of from about 25° to about 100° C. while said suspension of droplets is being moved under plastic flow in contact with heat exchange surfaces, and said beads of polymer are recovered by passing the said suspension of beads through a screen adapted to retain said beads.

8. The method as defined by claim 1, and further characterized by said monomeric material being a mixture of an alkyl acrylate and a chloroethyl vinyl ether, by said aqueous mucilaginous composition containing from about 50 to about 250 p.p.m. based on the weight of mucilaginous composition of the sodium salt of 2.4-dinitrobenzene sulfonic acid as an inhibitor of aqueous phase polymerization, by said polymerization being conducted at a temperature of from about 25° to about 100° C. while said suspension of droplets is being moved under plastic flow in proximity to heat exchange surfaces, and said beads are recovered by passing the said suspension of beads through a screen sized to retain said beads.

9. The method as defined in claim 1, and further characterized by said monounsaturated monomer being styrene.

10. The method as defined in claim 1 and further characterized by said monounsaturated monomer being vinyl chloride.

11. In a method of preparing stable aqueous suspensions of polymeric materials wherein the polymeric materials constitute more than about 50 percent/wt. of the total suspension, the improvement which comprises polymerizing under plastic flow conditions at a temperature of about 0° C. to about 150° C. and a solution of a monomer-soluble peroxygen catalyst in a monounsaturated monomer selected from the class consisting of vinyl halides, styrene and nuclearly-substituted halostyrenes, alkyl acrylates, alkyl alkacrylates, acrylonitrile and mixtures thereof while suspended as discrete substantially spherical droplets of such monomer from about 1 micron to about 1 centimeter in average diameter in an aqueous mucilaginous composition containing from about 50 to about 250 p.p.m. based on the weight of mucilaginous composition of an alkali or ammonium salt of a nitrobenzene sulfonic acid as an inhibitor of aqueous phase polymerization and possessing plastic flow properties including a Brookfield yield value at least 25 percent higher than is calculated from the expression $[25.6R (D-D_o)]^{2/3}$ wherein R is the average radius of said monomer droplets, $D - D_o$ is the difference between the densities of the aqueous and monomer phases, and $g$ is the acceleration due to gravity, there being employed from about 10 percent to about 40 percent/wt. of said monomer and from about 90 percent to about 60 percent/wt. of said aqueous mucilaginous composition thereby producing an aqueous suspension of said polymeric material in the form of substantially spherical beads of average size ranging from about 1 micron to 1 centimeter, and thereafter removing that proportion of said aqueous mucilaginous composition from the said reaction mixture as is required to concentrate it and produce a final product containing more than about 50 percent of its total weight as said beads, said aqueous mucilaginous composition deriving its rheological characteristics by reason of containing from about 0.05 to about 0.50 percent/wt. based on the weight of said mucilaginous composition of a lightly cross linked, highly swellable interpolymer of acrylic acid with from about 0.2 percent to about 2.5 percent/wt. based on the total monomers of said interpolymer of a polyalkenyl polyether of a polyhydroxy carbohydrate derivative containing from 2 to about 6 alkenyl ether groupings per molecule said interpolymer being neutralized to a pH of between about 5 and 8 mainly by a monovalent alkaline material and from about 0.5 to about 2.5 mol percent of the carboxyl groups by a basic organic amine containing at least six carbon atoms per molecule.

12. The method as defined in claim 11, and further characterized in that said monounsaturated monomer comprises an alkyl acrylate in which the alkyl group contains from four to eight carbon atoms and from about 0.005 to about 0.20 percent/wt. based on the total weight of monomers of a crosslinking monomer, and said reaction mixture is concentrated to contain more than about 60 percent/wt. of the resulting lightly cross-linked beads.

* * * * *

PO-1050
(5/69)

UNITED STATES PATENT OFFICE
CERTIFICATE OF CORRECTION

Patent No. 3,620,988    Dated November 16, 1971

Inventor(s) LOUIS COHEN

It is certified that error appears in the above-identified patent and that said Letters Patent are hereby corrected as shown below:

Col. 2, line 64 "out" should read --and--.
Col. 3, line 13, "THe" should read --The--.
Col. 4, line 14 "stabilizers" should read --stabilities--;
   line 21, after "viscosity" insert --at--.
Col. 5, line 10 "ad" should read --and--; line 20, "if" should read --of--.
Col. 10, line 71 delete "—" before "145".
Col. 12, space between "is" and "84" in line 3; same line 3 after "viscosity" insert -- at--; line 20 after "mesh" insert --(--; line 63 "reacln" should read --reaction--.
Col. 13, in the example after "2,CLEVE, parts/wt." insert --(1)--; line 72 after "hours" insert --at--.
Col. 14 in Example IV in headings after "Droplet wt. average particle size" insert --(1)--.
Col. 16, line 17, after "are" second occurrence, insert --not--.

Signed and sealed this 15th day of August 1972.

(SEAL)
Attest:

EDWARD M. FLETCHER, JR.
Attesting Officer

ROBERT GOTTSCHALK
Commissioner of Patents